Oct. 29, 1968  J. L. FOLLETT  3,407,827
AUTOMATIC SHUT-OFF VALVE
Filed Sept. 20, 1963  2 Sheets-Sheet 1

INVENTOR.
JOHN L. FOLLETT.
BY
D. Emmett Thompson
HIS ATTORNEY.

Oct. 29, 1968  J. L. FOLLETT  3,407,827
AUTOMATIC SHUT-OFF VALVE
Filed Sept. 20, 1963  2 Sheets-Sheet 2
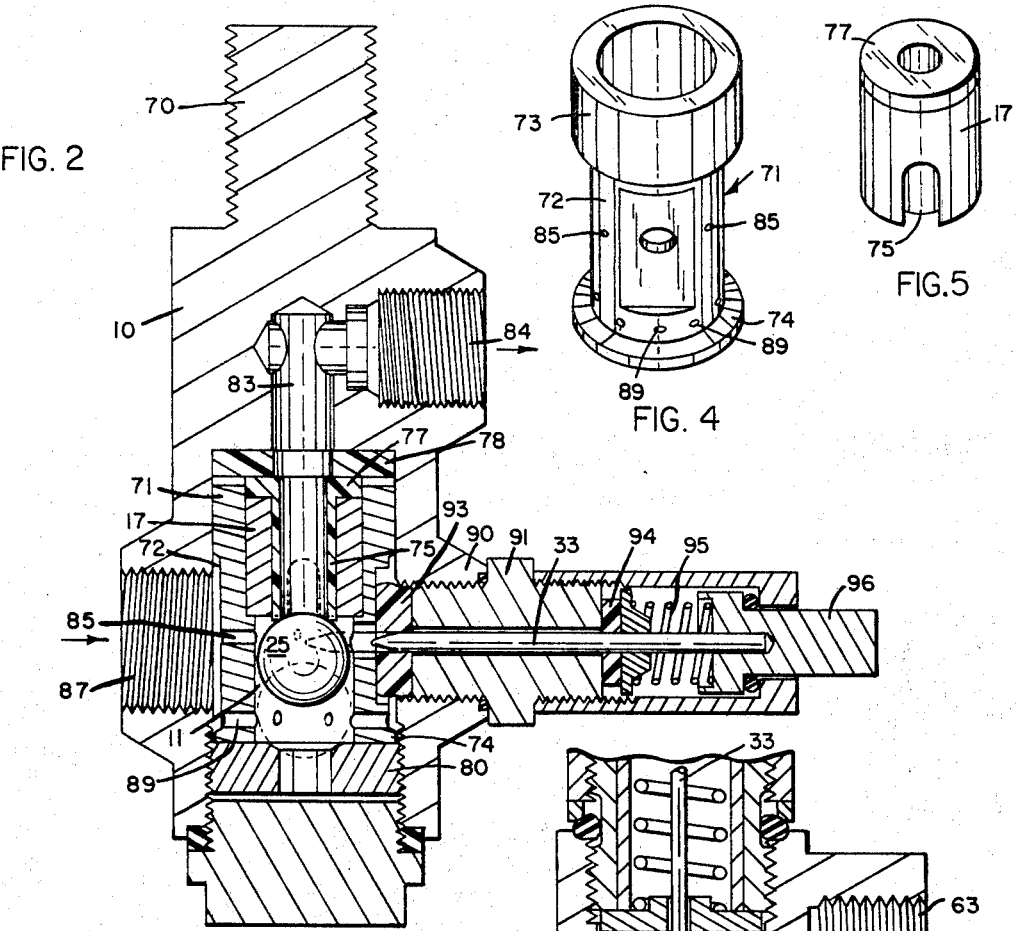
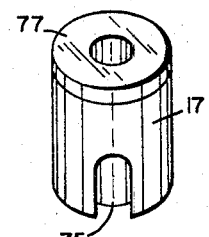
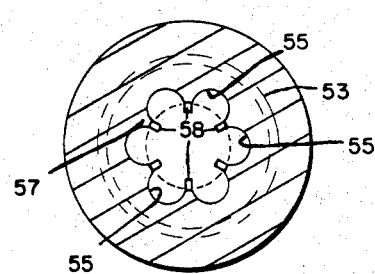
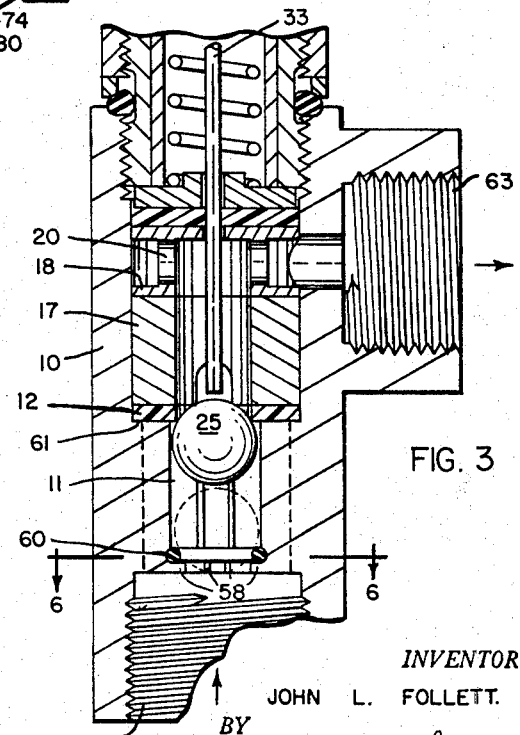
INVENTOR.
JOHN L. FOLLETT.
BY
D. Emmett Thompson
HIS ATTORNEY.

United States Patent Office 3,407,827
Patented Oct. 29, 1968

3,407,827
AUTOMATIC SHUT-OFF VALVE
John L. Follett, Fair Haven, N.Y. 13064
Filed Sept. 20, 1963, Ser. No. 310,235
4 Claims. (Cl. 137—39)

This invention has to do with valves for controlling the flow of fluid and more particularly, to a valve embodying an arrangement whereby, under certain conditions, the valve will function to automatically shut off the flow of fluid and will remain in closed position until intentionally reset.

At the present time, portable heating devices designed to burn gaseous, or liquid fuel, are used extensively in trailers, camps, boats, etc. There have been instances where these stoves, or heating devices, become accidentally upset when no one is in the immediate vicinity and have started serious fires.

This invention has as an object a valve designed particularly for the attachment to such a heating device and embodying a structural arrangement which, upon the device being upset, functions to immediately and automatically shut off the flow of fluid and remain in closed position until the valve is manually, or intentionally, reset for normal operation.

The invention has a further object an automatic shut-off valve embodying a unique compact structure economical to manufacture, and which will function over long periods of time without maintenance.

The invention has as a further object an automatic shut-off valve embodying an arrangement which functions to shut off the flow of fluid if such flow exceeds a predetermined volume.

The invention has as a further object a valve of the type referred to embodying an arrangement, whereby the valve can not be manually reset to normal open position unless the fuel supply to the valve, or the demand therefrom, is shut off.

The invention consists in the novel features and in the combinations and constructions hereinafter set forth and claimed.

In describing this invention, refererence is had to the accompanying drawings in which like characters designate corresponding parts in all the views.

In the drawings—

FIGURE 2 is a modification of the structure shown in FIGURE 1.

FIGURE 3 is a modified form of the valve shown in FIGURE 1.

FIGURE 4 is a perspective view of the cage element shown in FIGURE 2.

FIGURE 5 is a perspective view of the permanent magnet and valve seat shown in FIGURE 2.

FIGURE 6 is a view taken on line 6—6, FIGURE 3.

Figure 1:
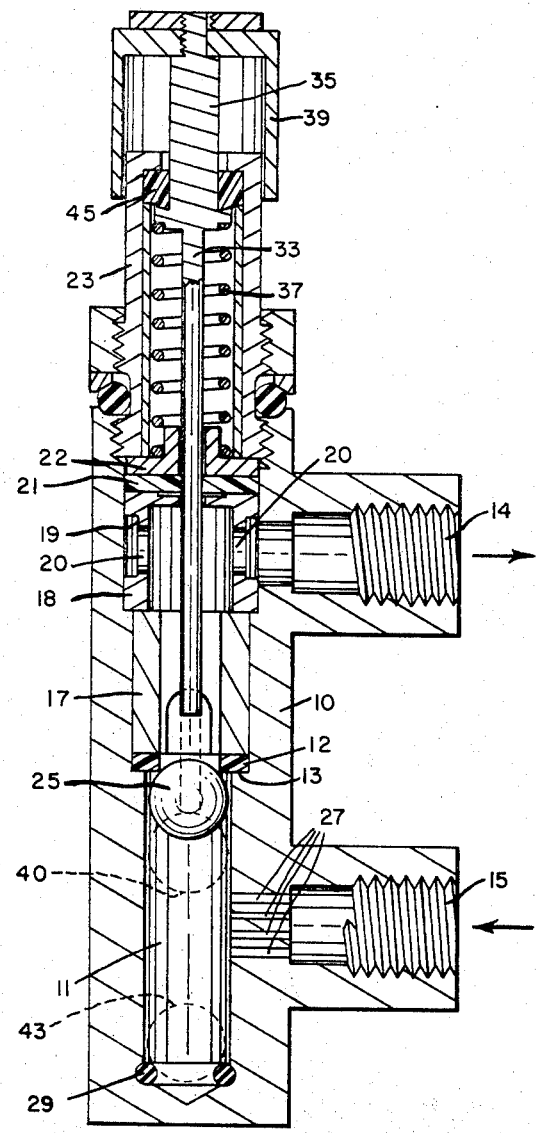
FIGURE 1 is a vertical sectional view of a valve embodying my invention.

Referring to FIGURE 1, the valve comprises a body member 10 formed in its lower portion with a vertically extending chamber 11. A valve seat 12 is positioned on a shoulder 13 at the upper end of the chamber 11. The body is also formed with an outlet port 14 above the valve seat 12 and communicating through the valve seat with the chamber 11. The body has an inlet port 15 communicating with the chamber 11. The valve seat 12 is in the form of a washer preferably formed of plastic material and is maintained against the annular shoulder 13 by a permanent magnet 17 of cylindrical form.

The upper end of the permanent magnet 17 is engaged by a sleeve 18 positioned in the upper end of the bore in the body. The sleeve 18 is formed, in its outer surface, with a circumferential groove 19, and a plurality of apertures 20 extending through the side wall in registration with the groove 19. The groove 19 is arranged in registration with the outlet port 14. A gasket 21 is positioned on the upper end of the sleeve 18, and is engaged by a disk 22 which is urged inwardly, or downwardly, against the gasket 21 by a sleeve 23 threaded into the upper end of the body bore.

A valve element 25, shown as of spherical formation, is positioned in the chamber 11 for free vertical movement into and out of engagement with the seat 13, to connect and disconnect the outlet port 14 with the chamber 11. The permanent magnet 17 functions, when the valve element 25 is moved in proximity to the seat, to hold the valve element against the seat and thereby disconnect the chamber 11 from the outlet port 14.

The valve is attached to a device to which fluid fuel is supplied, such as a stove. Normally, the valve is disposed in vertical position. If the stove is tipped over the valve element 25 moves by gravity in the chamber 11 toward the seat 12, and as it moves in proximity to the seat, it comes under the effective influence of the permanent magnet 17, and the magnet holds the ball securely against the seat to stop any further flow of fluid through the valve.

The inlet port 15 communicates with the chamber 11 through a series of passages 27. If the stove, or other device, is tipped over to move the valve in horizontal position and effect engagement of the valve element 25 against the seat 12, the valve element may, when the device and valve are returned to vertical position, be reset or moved to the bottom wall of the chamber 11. A gasket, or O-ring 29 is preferably positioned on the bottom wall of the chamber 11 to support the valve element when the valve is in normal operation.

Reset means is provided for manually moving the ball element 25 out of engagement with the seat 12 and out of the field of the effective influence of the permanent magnet 17. This reset mechanism, as shown in FIGURE 1, consists of a stem 33, slidably mounted in the disk 22 and having an enlarged head portion 35 slidably mounted in the upper end of the sleeve 23. A helical compression spring 37 is mounted on the stem 33 and interposed between the head 35 and the disk 22 and serves to yieldingly urge the stem 33 outwardly of the body to the position shown in full line, FIGURE 1. The head portion 35 of stem 33 is provided with a cylindrical member 39 dimensioned to telescope over the upper portion of the sleeve 23 and serves as a button for conveniently pressing the stem 33 inwardly. The stem 33 extends downwardly through the permanent magnet 17 and terminates in proximity to the seat 12. When the stem 33 is pushed downwardly, it engages the valve element 25 and moves the same downwardly out of engagement with the seat 12.

The extent of the movement of the stem 33 is such as to move the spherical valve element 25 downwardly away from the seat 12 and out of the effective influence of the permanent magnet 17, as shown by dotted outline at 40.

It will be observed, referring to FIGURE 1, that the inlet passages 27 communicate with the chamber 11 intermediate the ends thereof in an area below the position of the valve element 25, when moved downwardly by the reset stem 33. The diameter of the ball element 25, and the diameter of the bore of the cylindrical chamber 11 are such that there is only a slight clearance between the valve element and the wall of the chamber. With normal volume of fluid flow through the valve from the inlet passages 27 to the outlet 14, such flow of fluid will hold the valve element against the end of the stem 33 and, upon upward movement of the stem, will move the valve element 25 back into engagement with the seat 12. Accordingly, fluid flow through the valve can not be again obtained by simple pushing the reset stem 33 inwardly, but it is necessary to shut off the demand or the flow of fluid to the inlet 15 in order to permit the valve element 25 to drop to the bottom of the chamber, as indicated in dotted line at 43, FIGURE 1. In other words, to re-establish flow of fluid through the valve after the device to which it is connected has been tipped over, it is necessary to upright the device, shut off the demand of the supply of fluid to the valve and press the stem 33 inwardly. The fluid supply can then be re-established for normal operation.

The gasket 21 and a gasket 45 serve to prevent any escape of fluid from the valve around the stem 33 and the head 35 thereof, when the valve is in normal operation.

In the form shown in FIGURE 3, the valve body 10 is formed with a passageway extending axially throughout its length. The lower end of the passageway is threaded internally, as at 53, into which the conduit providing the flow of fluid to the valve is threaded. Above the threaded end 53, the body is formed with a circular series of axially extending grooves 55 forming flutes 57 which, at their lower ends, extend inwardly to form shoulders 58. This fluted arrangement forms the chamber 11 for the reception of the spherical valve element 25. An O-ring 60 is positioned on the shoulders 58 to support the ball valve 25 when it is in normal position.

The seat 12 has its peripheral portion positioned on an annular shoulder 61 at the upper end of the fluted chamber 11. The permanent magnet 17 is mounted in the bore of the body and positioned on the valve seat 12. The cage or sleeve 18 is positioned on the upper end of the magnet 17 and has the passages 20 communicating with the outlet port 63. The upper portion of the valve, including the reset stem 33, embodies the same structural arrangement as in FIGURE 1.

The purpose of the fluted chamber 11 is to permit greater flow of fluid through the valve as when relatively heavy liquid fuel is used.

In FIGURE 2, the valve body 10 is formed at its upper end with an externally threaded shank 70 which may be employed in attaching the valve to the stove, or other device. In this arrangement, the valve element receiving chamber 11 is in the form of a sleeve 71 mounted in the body. This sleeve is of cylindrical formation, and has an intermediate portion 72 of less diameter than the upper portion 73, and a flange portion 74 at the lower end, see FIGURE 4. The permanent magnet 17 is positioned in the upper end portion of the sleeve 71, which is counterbored to provide an annular shoulder on which the lower end of the magnet is positioned.

In this arrangement, the valve seat is in the form of a tubular member 75 mounted within the magnet 17 and is formed at its upper end with a laterally extending flange 77. In FIGURE 5, the seat member 75 is shown positioned within the magnet 17, which in turn is positioned within the sleeve 71, as shown in FIGURE 2. A gasket 78 is positioned on the upper end of the magnet sleeve assembly. A plug 80 is threaded into the lower end of the body 10 against the sleeve 71, moving the magnet and seat assembly against the washer 78 which, in turn, is moved upwardly against the top wall of the body bore. The body is formed with a passage 83 extending upwardly from the washer 78 and in registration with the hole in the center thereof, and communicates with the outlet port 84.

The intermediate reduced portion 72 of the sleeve 71 is formed with one or more apertures 85 communicating with the valve element receiving chamber 11. These apertures are positioned in the upper portion of the chamber 11 above the valve element 25 when it is resting on the plug 80. The sleeve 71 is also formed with additional apertures 89 which are located in the lower end portion of the sleeve below the horizontal diametric plane of the ball valve 25 when it is resting on the plug 80 at the bottom of the chamber, as shown in dotted outline, FIGURE 2. The apertures 85, 89, are inlet ports for conducting fluid from the inlet 87 to the chamber 11.

The apertures 85 are of such dimension as to provide a flow of fluid of predetermined value from the inlet port 87 which, together with the very small amount of fluid flowing from the apertures 89 upwardly around the ball valve 25, is sufficient to provide a volume of fluid for the normal operation of the heater, or other device, to which the valve is connected.

The body 10 is formed with a lateral hub 90 threaded internally to receive a member 91 formed with an axially extending aperture in which the reset stem 33 is slidably mounted. Suitable gaskets 93, 94, are provided to prevent leakage around the reset stem 33, and the outer end of the stem is provided with an operating button 96, the stem being urged outwardly by helical compression spring 95.

The arrangement is such that when the ball valve is held against the lower end of the seat member 75 by the magnet 17, as shown in full line, FIGURE 2, inward movement of the stem 33 will move the ball downwardly from the seat a sufficient distance to move it out of the effective influence of the permanent magnet 17, and the ball will drop on the plug 80. The clearance between the ball 25 and the side wall of the chamber 11 is such that if the flow of fluid through the valve exceeds that which can be furnished by the passages 85, the ball valve 25 will be moved upwardly into the field of the magnet and be attracted against the seat. In other words, if the flow of fluid through the valve exceeds that which is supplied by the apertures 85, the additional flow through apertures 89 will effect upward movement of the ball against the seat. Accordingly, if the hose or conduit connecting the valve to the heating device should break, or any other part should become defective, raising the fluid flow to abnormal high volume, the valve will automatically shut off the flow of fluid.

It will be apparent that in all the valve arrangements described, if the valve is moved toward or to horizontal position, the fuel supply will be instantly shut off and will not be reestablished until the valve is reset by moving the ball valve element 25 out of the field of the permanent magnet. In the arrangement of FIGURE 1, it is also necessary to shut off the supply of fuel to the valve, or the demand therefrom, in order to effect re-setting of the valve. In the arrangement of FIGURE 2 the valve, even though it remains in upright position, will close upon an abnormal flow of fluid through the valve.

In the arrangement shown in FIGURE 2, it is not necessary that the valve be tipped to horizontal position to effect movement of the valve element 25 into the effective field of the permanent magnet and against the valve seat. The presence of fuel pressure against the under side of the ball element 25 through the lower ports 89, with a slight clearance between the ball element and the chamber 11 will, if the valve receives an impact, result in the ball being moved upwardly into the effective field of the permanent magnet. This is a desirable feature when the valve is used in conjunction with a fuel consuming apparatus mounted in a vehicle, such as a house trailer. In the event the vehicle is involved in a collision but the valve remains upright, it will close.

It will be understood that these valves may be attached directly to a fuel supply tank, such as a liquid petroleum tank now used extensively for supply fuel to heating devices both of portable and fixed form.

What I claim is:

1. An automatic shut-off valve comprising a body, a valve seat element mounted in the body, a valve element receiving chamber extending downwardly from said valve seat element, an inlet port communicating with said chamber below said seat element, said body also having an outlet port above said seat element communicating through said seat element with said chamber, a valve element in said chamber and being free to move therein into engagement with said seat element upon said chamber being moved toward horizontal position to disconnect said outlet port with said chamber, one of said elements including a permanent magnet and the other of said elements including magnetic material, valve element support means fixed in said chamber and spaced downwardly from said seat element for positioning said valve element a distance below said seat element, whereby the effective influence of said permanent magnet is insufficient to move said valve element upwardly from said support means toward said seat element, said permanent magnet being operable when said chamber is moved toward horizontal position to effect movement of said valve element into engagement with said seat element and to maintain said engagement, reset means carried by said body in fluid tight relation thereto and operable externally thereof for moving said valve element downwardly from said seat out of the effective influence of said permanent magnet.

2. An automatic safety shut-off valve comprising a body, a valve seat mounted in the body, a valve chamber extending downwardly from said seat, said body being provided with an outlet port above said seat communicating through said seat with said chamber, a valve element of magnetic material in said chamber for free vertical movement therein, a permanent magnet mounted in juxtaposition to said seat and operable to hold said valve element in closing engagement with said seat when said valve element is moved in proximity thereto to disconnect said outlet port from said chamber, valve supporting means fixed in said chamber and spaced downwardly from said seat a distance sufficient to position said valve element when resting on said support means out of the effective influence of said permanent magnet, an inlet port extending through the side wall of said valve chamber above said valve element when the same is resting on said support means, said inlet port being dimensioned to provide a fluid flow of predetermined value through said valve chamber, an additional inlet port communicating with said chamber below said valve element when the same is positioned on said supporting means, a clearance between said valve element and the wall of said chamber being such that if the volume of flow of fluid through said valve chamber exceeds such predetermined value, the flow through said second port will move said valve element upwardly against said seat.

3. An automatic safety shut-off valve as set forth in claim 2, wherein said valve chamber is of cylindrical form and said valve element is of spherical form.

4. An automatic shut-off valve comprising a body, a permanent magnet fixedly mounted in the body and an annular seat portion positioned at the lower end of said permanent magnet, a valve element receiving chamber extending downwardly from said seat, said body being also formed with an outlet port above said seat and communicating through said seat with said chamber, a ball valve element of magnetic material in said chamber and being free to move vertically therein into and out of engagement with said seat to connect and disconnect said chamber with said outlet port, said permanent magnet being operable to hold said ball valve element in engagement with said seat when said element is moved in proximity thereto, said chamber having a bottom wall spaced downwardly from said seat a distance sufficient to position said ball valve element resting on said bottom wall out of the influence of said permanent magnet, reset means carried by said housing and operable externally thereof to move said ball element downwardly from said seat to a reset position out of the effective influence of said permanent magnet, said housing being formed with an inlet port communicating with said chamber above said bottom wall and below the position to which said ball is moved downwardly by said reset means, the clearance between said ball valve element and the wall of said chamber being such that the pressure of fluid through said inlet will prevent downward movement of said ball element from the reset position.

References Cited

UNITED STATES PATENTS

| 2,368,281 | 1/1945 | Wittenberg | 251 |
| 2,391,017 | 12/1945 | Grontkowski | 251 |

FOREIGN PATENTS

| 744,858 | 2/1956 | Great Britain. |
| 70,239 | 9/1930 | Sweden. |

WILLIAM F. O'DEA, *Primary Examiner.*

HAROLD W. WEAKLEY, *Assistant Examiner.*